United States Patent
Henry et al.

(10) Patent No.: US 10,863,368 B2
(45) Date of Patent: Dec. 8, 2020

(54) MACHINE LEARNING BASED ADAPTIVE SHORT BEACON TRANSMISSION

(71) Applicant: Cisco Technology, Inc., San Jose, CA (US)

(72) Inventors: Jerome Henry, Pittsboro, NC (US); Pooya Monajemi, Irvine, CA (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/362,451

(22) Filed: Mar. 22, 2019

(65) Prior Publication Data

US 2020/0305008 A1    Sep. 24, 2020

(51) Int. Cl.
| | |
|---|---|
| *H04W 24/02* | (2009.01) |
| *H04W 28/02* | (2009.01) |
| *G06N 3/08* | (2006.01) |
| *G06N 20/00* | (2019.01) |
| *H04W 48/10* | (2009.01) |
| *H04W 84/12* | (2009.01) |

(52) U.S. Cl.
CPC .............. *H04W 24/02* (2013.01); *G06N 3/08* (2013.01); *G06N 20/00* (2019.01); *H04W 28/0226* (2013.01); *H04W 48/10* (2013.01); *H04W 84/12* (2013.01)

(58) Field of Classification Search
CPC . H04W 24/02; H04W 28/0226; H04W 84/12; H04W 48/10; G06N 20/00; G06N 3/08; H04L 47/70; H04L 47/72; H04L 47/74; H04L 47/78; H04L 47/80
See application file for complete search history.

(56) References Cited

U.S. PATENT DOCUMENTS

| 10,542,490 B2 * | 1/2020 | Ryoo ................ H04W 52/0219 |
| 2005/0047386 A1 * | 3/2005 | Yi ........................ H04W 68/025 370/345 |
| 2006/0088019 A1 * | 4/2006 | Liebsch ............ H04W 52/0216 370/338 |
| 2007/0036097 A1 * | 2/2007 | Costa ................ H04W 52/0235 370/318 |
| 2013/0177000 A1 * | 7/2013 | Abraham ............ H04W 64/003 370/338 |

(Continued)

OTHER PUBLICATIONS

Chang H, Song YE, Kim H, Jung H (2018) Distributed transmission power control for communication congestion control and awareness enhancement in VANETs. PLoS ONE 13(9): e0203261. https://doi.org/10.1371/journal.pone.0203261.

(Continued)

*Primary Examiner* — Sharad Rampuria
(74) *Attorney, Agent, or Firm* — Patterson + Sheridan, LLP (57) ABSTRACT

A machine learning based adaptive short beacon activation (SBA) engine is described. The SBA engine provides for activating or suppressing short beacon transmission in a network cell based on total network cell effects in both airtime consumption and network flows as determined by the SBA engine. In some examples the SBA engine utilizes input parameters received from various wireless medium to evaluate the current and near future advantages and/or disadvantages of activating/suppressing short beacons.

20 Claims, 7 Drawing Sheets

(56) References Cited

U.S. PATENT DOCUMENTS

2015/0131628 A1    5/2015    Chu et al.
2017/0257814 A1    9/2017    Kim et al.

OTHER PUBLICATIONS

Summer et al., "Adaptive Beaconing for Delay-Sensitive and Congestion-Aware Traffic Information Systems," 2010, IEEE Vehicular Networking Conference [Abstract Only].

Shah et al., "Adaptive Beaconing Approaches for Vehicular Ad Hoc Networks: A Survey," IEEE Systems Journal </xpl/RecentIssue.jsp?punumber=4267003> ( vol. 12 , Issue: 2 </xpl/tocresult.jsp?isnumber=8350419> , Jun. 2018 ) [Abstract Only].

Hassan et al, "Adaptive beaconing system based on fuzzy logic approach for vehicular network," 2013 IEEE 24th Annual International Symposium on Personal, Indoor, and Mobile Radio Communications </xpl/mostRecentIssue.jsp?punumber=6656121> {Abstract Only}.

Alhameed et al, "VANET scalable fuzzy logic based adaptive beaconing," 2017 IEEE Symposium Series on Computational Intelligence (SSCI) </xpl/mostRecentIssue.jsp?punumber=8267146> {Abstract Only}.

Kim et al., "A request based adaptive beacon rate control scheme for Vehicular Ad-hoc Networks," 2016 Eighth International Conference on Ubiquitous and Future Networks (ICUFN) </xpl/mostRecentIssue.jsp?punumber=7527553> {Abstract Only}.

\* cited by examiner

MACHINE LEARNING BASED ADAPTIVE SHORT BEACON TRANSMISSION

TECHNICAL FIELD

Embodiments presented in this disclosure generally relate to adaptive short beacon transmission in a network cell. More specifically, embodiments disclosed herein include using a machine learning neural network to optimize short beacon activation and to dynamically adjust short beacon transmission in the network cell according to various conditions in the network cell.

BACKGROUND

Access points can transmit short beacons in a network cell to increase the scanning/probing efficiency of client devices in the network cell. The short beacons provides information to the client devices which allows for the client device to reduce time spent scanning any individual channel and allows for the client device to jump to target channels at a time of a next expected target beacon signal.

While transmitting short beacons is useful to reduce the scanning process for individual client devices in the cell, the presence of short beacons in the cell can sometimes cause congestion and waste airtime in the network cell. Additionally, short beacon transmission can cause unwanted or unintended reactions in the network flows for applications in the network cell. To comply with new standards for Wi-Fi and wireless networks, access points provide for short beacon transmission, but can alter the activation properties of the short beacon transmissions and still comply with the standards. However, current implementations do not provide an effective means for altering the short beacon activation to enhance and/or optimize network cell performance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for short beacon activation (SBA) at an access point (AP) in a network cell. The method includes receiving one or more network conditions for the network cell including one or more network transmission conditions and one or more network flow conditions; determining, from the one or more network transmission conditions, an airtime effect of SBA on the network cell; determining, from one or more network flow conditions, one or more application effects of SBA on the network cell; and determining, from the airtime effects and the one or more application effects, an SBA decision for the network cell; and implementing the SBA decision for the network cell. Other embodiments of this aspect include corresponding computer systems, apparatus, and computer programs recorded on one or more computer storage devices, each configured to perform the actions of the methods.

In another example embodiment, a system for short beacon activation (SBA) at an access point (AP) in a network cell, including: a processor; and a memory including instructions which, when executed on the processor, performs an operation. The operation includes: receiving one or more network conditions for the network cell including one or more network transmission conditions and one or more network flow conditions; determining, from the one or more network transmission conditions, an airtime effect of SBA on the network cell; determining, from one or more network flow conditions, one or more application effects of SBA on the network cell; and determining, from the airtime effects and the one or more application effects, an SBA decision for the network cell; and implementing the SBA decision for the network cell.

In another example embodiment, a computer program product for short beacon activation (SBA) at an access point (AP) in a network cell is described. The computer program product including a non-transitory computer-readable medium program having program instructions embodied therewith, the program instructions executable by a processor to perform an operation. The operation includes: receiving one or more network conditions for the network cell including one or more network transmission conditions and one or more network flow conditions; determining, from the one or more network transmission conditions, an airtime effect of SBA on the network cell; determining, from one or more network flow conditions, one or more application effects of SBA on the network cell; and determining, from the airtime effects and the one or more application effects, an SBA decision for the network cell; and implementing the SBA decision for the network cell.

EXAMPLE EMBODIMENTS

In general, for a Wi-Fi network cell, a message, such as a target beacon with connection and other information for the access point/Wi-Fi network, is transmitted from the access point (AP) approximately every 100 millisecond (ms) for each service set identifier (SSID) on the AP. When a client device within a coverage area of the Wi-Fi network cell receives the target beacon, it can determine from the information whether to connect to the SSID, the channel, and/or the AP, or to continue scanning for another channel/SSID/AP. In many cases, these target beacons are large messages (e.g., 300-500 bytes) and consume airtime and bandwidth in the network cell of the AP, making more frequent transmission (e.g., every 20 ms) impractical.

On the other hand, these messages are often too far apart for efficient use during a scan by a client device scanning for a network connection. In some examples, the client device scanning a channel may have to wait 100 ms or longer before moving to another channel. As the rate of channels/SSIDs hosted by APs increases, these scanning processes can introduce long delays before the client device finds an appropriate connection.

In order to reduce the amount of waiting time for the scanning client devices, the IEEE 802.11ai™ study group amendment describes Fast Initial Link Setup (FILS) Discovery frames for high density network cells, by which an AP can transmit/broadcast short beacon signals (e.g., the FILS discovery frames) to a scanning station or client device. The short beacons are in a compact form and include various information about the network cell and the AP including information about information about all the SSIDs hosted by the AP and a reduced neighbor report related to other APs providing the SSID. The short beacons can also indicate the next target beacon time when the more extensive information described above will be broadcast by the AP.

The short beacons increase the efficiency of the client device scanning process by reducing the time spent scanning by each client device on any channel and reducing probing signals sent in the network cell. For example, if the short beacon is transmitted every 20 ms and the target beacon is transmitted every 100 ms, the scanning client device can determine if it will connect to the AP on the channel prior to waiting for the target beacon. This allows the scanning client device to potentially jump to multiple target channels between each target beacon transmission and connect to an appropriate channel without waiting for each target beacon. In optimized solutions, the short beacon saves airtime by not only removing the need for probe requests from the scanning clients and responses from the AP, but also reduces the amount of time the scanning client devices spends on any scanned channel before connecting to a network cell.

While short beacon transmission is useful for the individual scanning clients, the transmission of the short beacons often comes with costs for the overall network cell. For example, some network cells may include client devices that are not able to receive/parse short beacons, where transmitting short beacons does not reduce the amount of traffic noise/congestion in the network cell and instead only increases the traffic and airtime consumption. In default implementations of short beacon transmission, APs are expected to send unsolicited broadcast FILS Discovery frames (i.e., short beacons) as often as every 20 ms (5 times more often than the default target beacon), thus wasting considerable amount of airtime when the short beacons are not necessary. Additionally, in some examples, where APs provide information about a next target beacon target time for other SSIDs/channels/APs in the short beacons, the addition of inter-AP synchronization messages introduces more airtime use between the APs.

Furthermore, in order to comply with Wi-Fi alliance (WFA) optimized connectivity experience (OCE), APs support for providing the FILS Discovery frames is mandatory. However, WFA OCE only mandates the ability to send such frames or short beacons, and does not provide restrictions on the mechanisms by which these frames/short beacons should be suppressed or activated. In some examples, no threshold is provided for activating short beacons, instead the OCE enabled systems detect that clients support the OCE and then activate short beacon transmission, but do not determine a proportion of supporting/non supporting client devices. In some examples, a strict threshold-based mechanism to suppress or active short beacons is provided. For example, if the number of clients supporting reception of short beacons is greater than the number of clients not supporting short beacons, then short beacons are activated. However, these strict thresholds do not fully account for the various effects of the short beacons on the network cell because the efficiency gained with activation/suppression is a function of many factors including traffic mix, client device density, how many of the devices support short beacons, and the client devices position in the cell.

In order to determine a system wide effect for a network cell considering all of the possible variables, a machine learning based adaptive short beacon activation (SBA) engine is described herein. The SBA engine provides for activating or suppressing short beacon transmission based on total network cell effects determined by the SBA engine. In some examples the SBA engine utilizes input parameters (e.g., network conditions such as network transmission conditions for the network cell) received from various wireless medium (e.g., neighboring APs, clients devices, etc.) to evaluate the current and near future advantages and/or disadvantages of activating/suppressing short beacons.

Among the properties determined by the SBA engines are the airtime or traffic effect of the short beacons on the network cell and application or network flow effects of the short beacons on the network flow traffic for applications in the network cell. From these properties the SBA engine determines an SBA decision of whether to suppress the short beacons or to activate the short beacons and implements the SBA decision at the AP.

Figure 1:
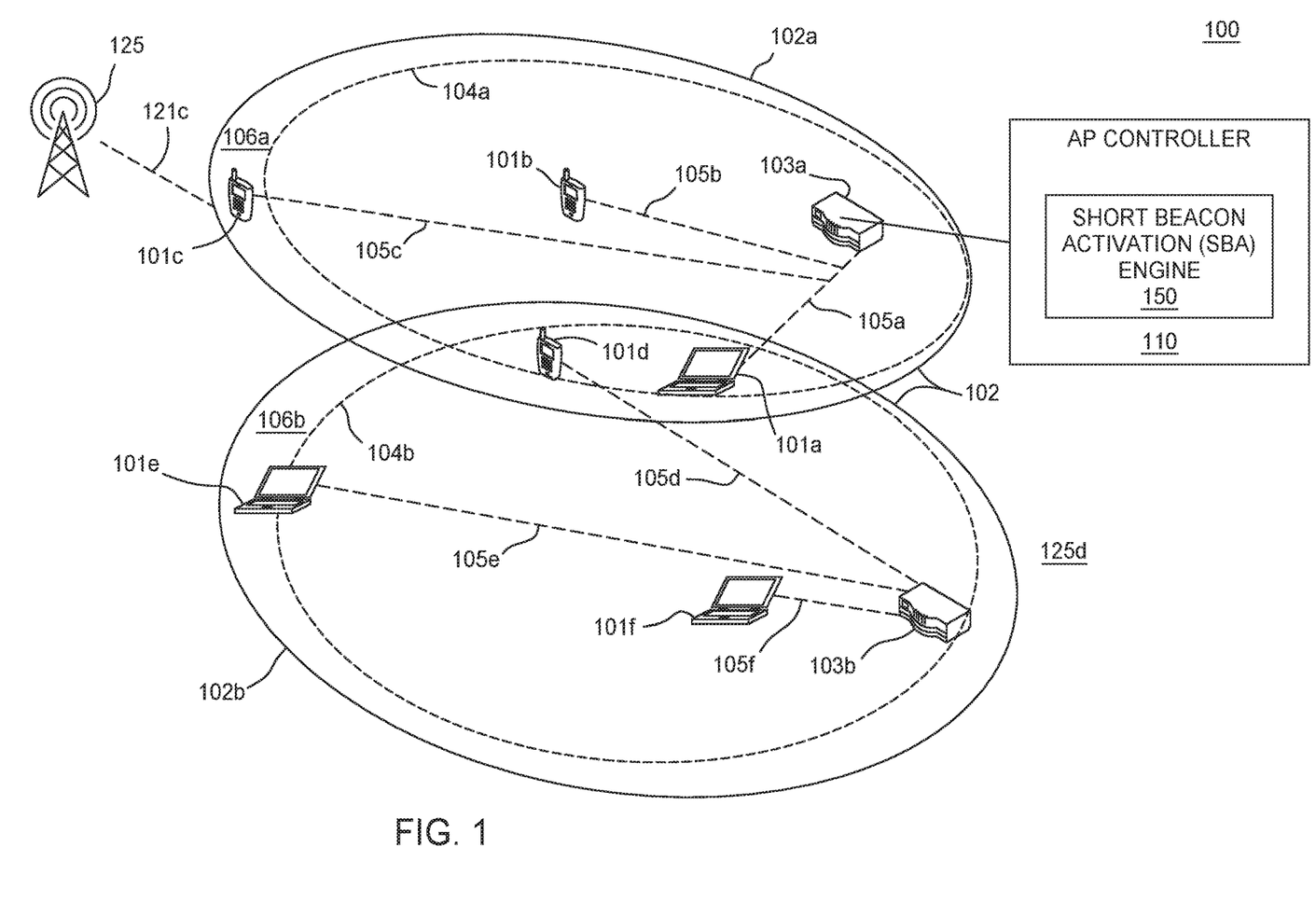
FIG. 1 illustrates a network cell system, according to one embodiment.

FIG. 1 illustrates a network cell system, according to one embodiment. As shown, network cell system 100 includes a network 102 including network cells 102a and 102b, where client devices within the network cells 102a and 102b can connect to and/or are connected to access points (APs) of the network 102. For example, radio components of the AP 103a provide device connections within the network cell 102a and radio components of the AP 103b can provide device connections within the network cell 102b. In some examples, the APs 103a and 103b are single antenna systems. In one embodiment, the APs 103a and 103b each have an AP controller, such as AP controller 110 located on the AP 103a which includes the SBA engine 150.

The client devices (referred to generally as client devices 101) include devices connected to the network 102 through AP 103a, such as client device 101a connected through connection 105a to AP 103a, client device 101b connected through connection 105b to AP 103a, and client device 101c connected through connection 105c to AP 103a. Likewise, the client devices 101 also include devices connected to AP 103b, such as client device 101d connected through connection 105d to AP 103b, client device 101e connected through connection 105e to AP 103b, and client device 101f connected through connection 105f to AP 103b. In some instances, the APs 103a and 103b may provide stronger radio connections to the client devices within strong coverage areas 104a and 104b respectively. The areas still covered by the network cells 102a and 102b, but not within strong coverage areas 104a and 104b are cell edges 106a and 106b, where some client devices may become scanning devices/clients which begin scanning for a new network connection. For example, client devices 101c, 101e, and 101d may be scanning devices where they are maintaining a connection to their respective APs despite not being in a strong coverage area, but scanning for additional connections.

As shown, some client devices may also have connections to a wireless network, such as wireless network 125. In some examples, the client device 101c sends a signal to the AP 103a indicating the client device is (1) LTE capable, and (2) currently has an LTE connection. In some examples, the SBA engine 150 uses this relieved information along with the client signal on WI-FI and the client location to determine that the client device may transfer a connection to the LTE network at that location if needed.

In order to determine an SBA decision, the SBA engine 150 utilizes information received from the wireless medium in the network 102. For example, the AP controller 110 and the SBA engine 150 receive information such as an AP deployment density in the network cell from a network management system. In another example, the AP controller 110 may receive an indication of two APs (e.g., AP 103a and 103b) being deployed in the network 102. In another example, there may be multiple APs within each cell, such as two APs within network cell 102a. The SBA engine 150 also receives an indication of a position of a connected device in the network cell. For example, the SBA engine 150 receives an indication that the client device 101c is far from the AP 103a. The SBA engine 150 may also receive an indication that the client device 101d is located in the cell edge 106a.

In another example, the SBA engine 150 receives a number of APs visible to the connected device, for example, the client devices 101d and 101a have visibility to both the AP 103a and 103b. In some examples, the SBA engine 150 also receives an indication of a client device's visibility to other network radios. For example, the client device 101c has visibility to the wireless network 125.

The SBA engine 150 also receives and/or determines a ratio of clients supporting short beacons connected to the network cell to clients (e.g., OCE enabled clients) connected to the network cell to clients not supporting short beacons (e.g., non-OCE clients). For example, in the network cell 102a, the client devices 101b, 101c, and 101d are capable of receiving and interpreting short beacons such as FILS discovery messages and the client device 101a is not able to receive short beacons. Thus the ratio of supporting to non-supporting client devices is 3-1. In contrast, in the network cell 102b, the client device 101d is the only supporting client while client devices 101a, 101e, 101f are non-supporting devices. Thus the ratio of supporting to non-supporting client devices in the network cell 102b is 1-3.

The SBA engine 150 also receives a measure of current probe traffic statistics for the network cell. For example, the cell 102a has several client devices in the cell edge 106a, which may induce the devices to increase their probe signals during scanning for another channel/SSID. The SBA engine 150 also receives a current state of short-beacon transmissions in the network cell. For example, the AP 103a may have a default state of transmitting short beacons, thus the AP 103a is operating under SBA. Additionally, as the SBA engine determines SBA decisions, the current state of short beacon transmissions is updated (e.g., SBA or suppressed short beacons, etc.). In some examples, the SBA engine 150 has several interacting components as shown in FIG. 2.

Figure 2:
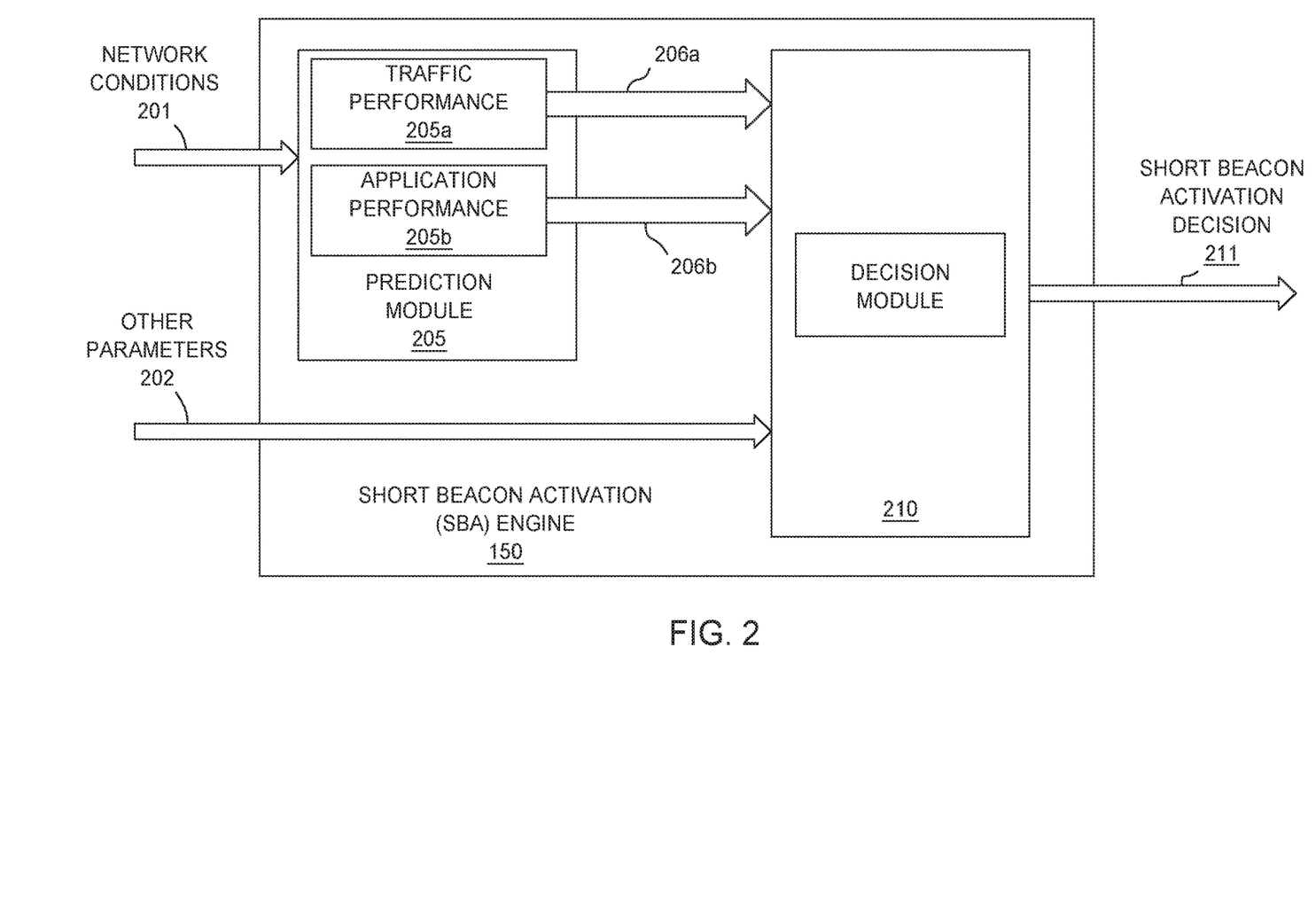
FIG. 2 illustrates a short beacon activation engine, according to one embodiment.

FIG. 2 illustrates a short beacon activation engine, according to one embodiment. In some examples, the SBA engine 150 functions as a machine learning system/supervised learning technique such as a multilayer/layered neural network and stores machine learning outputs such as a trained neural network nodes in the machine learning outputs 322. While described herein in relation to a neural network, other supervised learning and machine learning algorithms may be used in the SBA engine. As shown, the SBA engine 150 includes a prediction module 205. In some examples, the prediction module 205 includes two components including a traffic performance prediction module 205a and an application performance prediction module 205b.

In general, the traffic performance prediction module 205a predicts an impact on overall probe traffic from the client devices in the network cell and airtime consumption of the various transmissions (e.g., the short beacons, probe signals, target beacons etc.) during SBA and/or when short beacons are suppressed. An optimization goal for the traffic performance prediction module 205a is to predict if suppressing or enabling short beacons will reduce the airtime consumed by probing clients (based on the OCE to non-OCE ratio), while accounting for the airtime consumed by the short-beacons themselves. For example, the SBA engine 250 determines, based on the OCE to non-OCE ratio (e.g., 3-1 as discussed above) for the network cell 102a and the number of probing clients (e.g., the client devices 101d, 101c in the cell edge 106a), that short beacon transmission will reduce the overall probe traffic and airtime consumption for the network cell 102a.

In some examples, the probing traffic from the client devices 101c and 101d is not standardized, such that each device is configured to send probe signals and respond to short beacons in different manners (such as different transmission frequencies). Thus in some examples, the traffic performance prediction module 205a factors the client device properties and behaviors, including those learned during the SBA engine processes, when determining the predicted impact on overall probe traffic and airtime consumption. For example, the SBA engine 150 begins by building a training set from a typology of device with a normal (e.g., Gaussian) distribution of features around mean values. The SBA engine 150 computes the airtime consumed by the queries (e.g., probes, etc.) of the normal distribution. This allows the SBA engine 150 to determine how much airtime will be consumed by queries (based on their typology and position in the cell) when one or more new client devices enter the cell.

The application performance prediction module 205b, evaluates the impact of the change on delay-sensitive applications/network flows. In some examples, the application performance prediction module 205b integrates the predicted impact on overall probe traffic and airtime consumption determined by the traffic performance prediction module 205a into a predicted effect on application flows/network flows. These applications and network flows are detected by the AP controller 110 and the typical behavior of the various applications is known and/or learned by the application performance prediction module 205b. For example, typical voice applications executing on the client devices transmit RTP packets at predictable intervals (e.g. 20 ms) in the network flows used by the applications. In some examples, when the interval between 2 real time protocol (RTP)

packets exceeds a learnable threshold (e.g. 30 ms), the client device/application will drop the next packet in a queue of the network flow in order to maintain a near-real time time-stamped flow. This is not desirable behavior for the applications/network flows.

In order to prevent applications dropping packets in network flows or other undesired behavior, the application performance prediction module 205b records the presence of such flows and uses the network flow conditions (e.g., a number of clients in the network cell, number of flows, modulation and coding scheme (MCS) rates, etc.) and predicts a mean (and sigma) interval between network flows (e.g., RTP flows). The application performance prediction module 205b also predicts the effect of SBA on the interval. In some examples, short beacon transmission reduces the overall consumed airtime in the network cell, but also results in an increase in the RTP packet interval, with a detrimental effect on RTP user experience at the client device.

The SBA engine 150 also includes a decision module 210. The decision module uses the airtime effects 206a and the one or more application effects 206b and determines an SBA decision 211. For example, when the airtime effects 206a indicates that overall network cell airtime usage would improve with short beacon transmission, the decision module uses the one or more application effects to further determine an SBA activation decision (e.g., activate short beacon transmission or suppress short beacon transmission).

In some examples, the decision module 210 also determines an SBA interval as part of the SBA decision 211. For example, the decision module 210 determines a first SBA interval for the short beacon transmission (e.g., default of 20 ms and/or a learned value). While the short beacons are transmitted in SBA, the decision module 210 receives other parameters 202 such as feedback from the client devices to determine if the SBA interval should be changed to provide an improvement to the network airtime and/or network flows. For example, the SBA engine 150, using a training set, evaluates if another interval is likely to cause the client to probe (because it did not receive the short beacon in a time that matches its internal algorithm maximums) or not probe. For example, the SBA engine predicts that increasing the SBA interval to 30 ms with the current client set would save airtime, but that 35 ms would cause a percentage of the clients to start transmitting probing signals.

Figure 3:
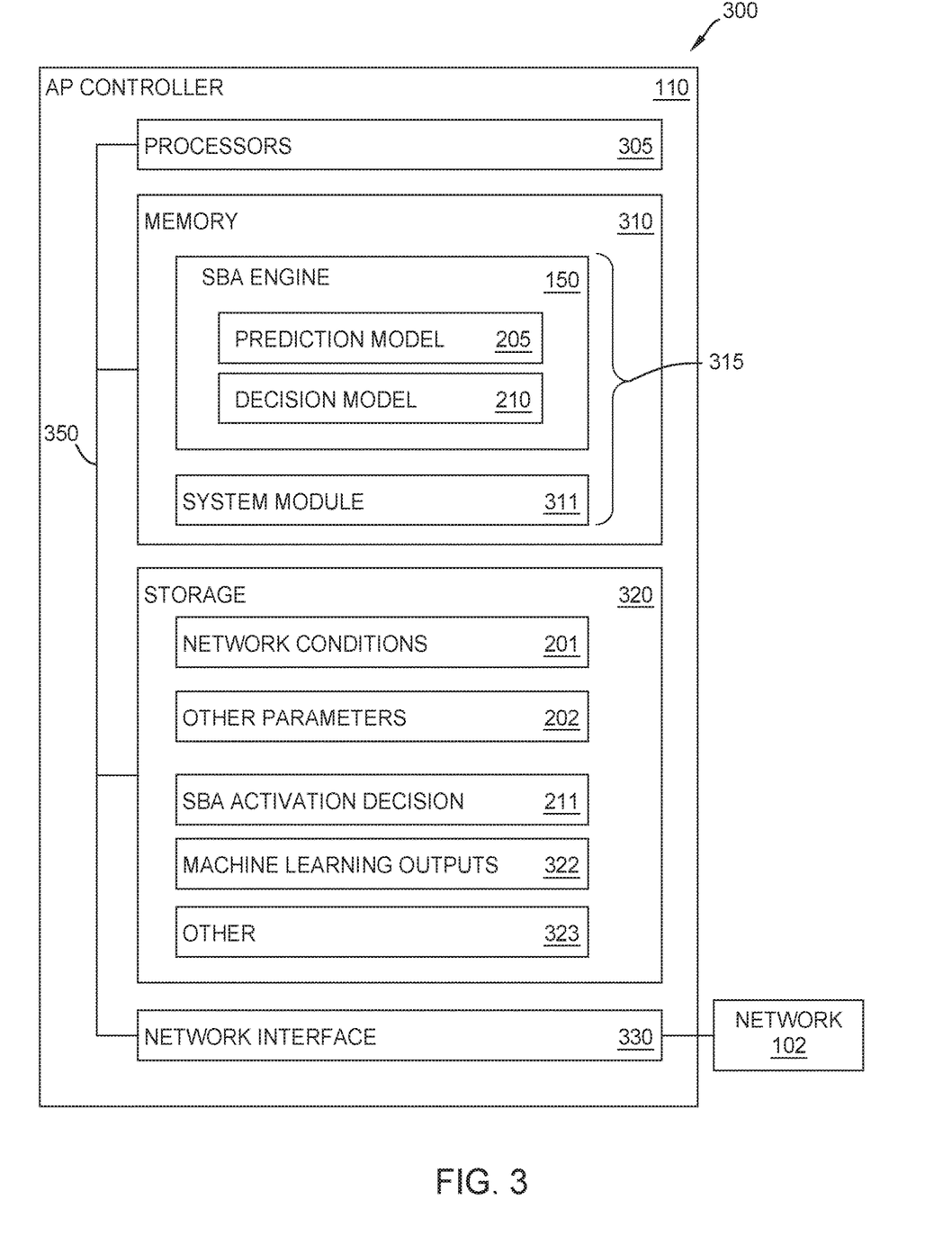
FIG. 3 illustrates a block diagram of an access point controller, according to one embodiment described herein, according to one embodiment.

FIG. 3 illustrates a block diagram of an AP controller according to one embodiment. As shown in FIG. 3, the arrangement 300 includes the AP controller 110, which perform the methods described herein at least in relation to FIGS. 4-7. The AP controller 110 is shown in the form of a general-purpose computing device. The components of AP controller 110 may include, but are not limited to, one or more processing units or processors 305, a system memory 310, a storage system 320, network interface 330, and a bus 350 that couples various system components including the system memory 310 and storage system 320 to processors 305 along with the network interface 330. The AP controller 110 provides network connections and transmits target beacons and short beacons among other signals to client devices in an associated network cell, such as the network cell 102a. In other embodiments, the arrangement 300 is distributed and includes a plurality of discrete computing devices that are connected through wired or wireless networking.

The bus 350 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

AP controller 110 typically includes a variety of computer system readable media. Such media may be any available media that is accessible by AP controller 110, and it includes both volatile and non-volatile media, removable and non-removable media.

System memory 310 can include computer system readable media in the form of volatile memory, such as random access memory (RAM) and/or cache memory. AP controller 110 may further include other removable/non-removable, volatile/non-volatile computer system storage media. In some examples, storage system 320 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. As further depicted and described below, system memory 310 includes include at least one program product having a set (e.g., at least one) of program modules 315 that are configured to carry out the functions of embodiments of the AP controller and the SBA engine described herein. AP controller 110 may further include other removable/non-removable volatile/non-volatile computer system storage media. In some examples, storage system 320 may be included as part of memory 310 and may typically provide a non-volatile memory for the networked computing devices, and may include one or more different storage elements such as Flash memory, a hard disk drive, a solid state drive, an optical storage device, and/or a magnetic storage device. Storage system 320 may include media for storing network conditions 201, other parameters 202, SBA decision 211, and ML Learning outputs 322, and other information 323 used by the AP controller 110. The information stored in storage system 320 may be updated and accessed by the program modules 315 described herein.

Memory 310 may include a plurality of program modules 315 for performing various functions related the function of the AP controller such as system module 311 as well functions related to the SBA engine 150 including the Prediction module 205 and decision module 210. The program modules 315 generally include program code that is executable by one or more of the processors 305.

Figure 4:
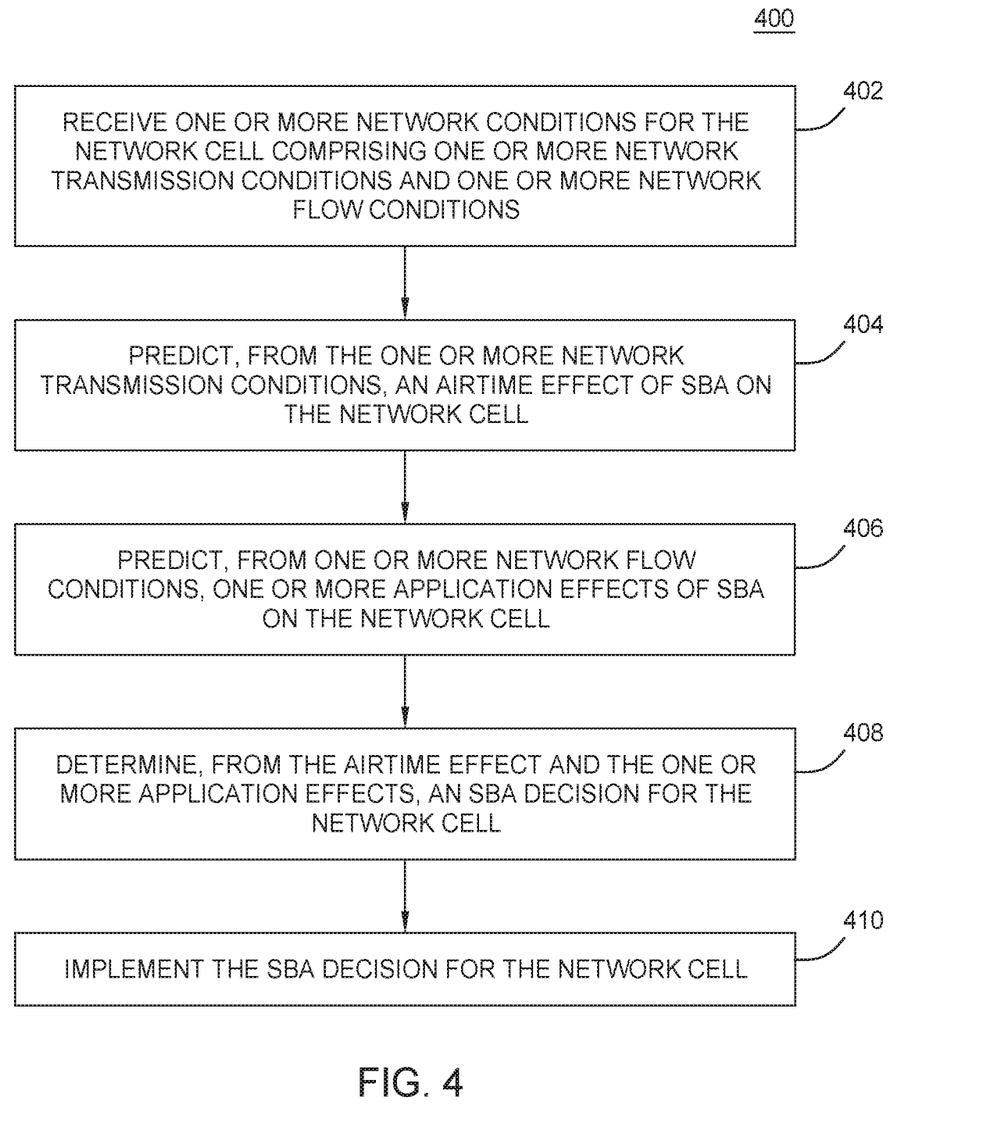
FIG. 4 is a flow chart outlining general operations for short beacon activation (SBA) at an access point (AP) in a network cell, according to embodiments described herein.

FIG. 4 is a flowchart outlining general operations for short beacon activation (SBA) at an access point (AP) in a network cell, according to embodiments described herein. Method 400 begins at block 402, where the prediction module 205, receives one or more network conditions 201 for the network cell 102a, where the network conditions 201 include one or more network transmission conditions and one or more network flow conditions. In some examples, the one or more network conditions for the network cell include one or more of an AP deployment density in the network cell, a position of a connected device in the network cell, a number of APs visible to the connected device, a ratio of Optimized Computing Environment (OCE) clients connected to the network cell to non-OCE clients, a measure of current probe traffic statistics, and a current state of short-beacon transmissions in the network cell. In some examples, the SBA engine 150 functions to ensure that the transmission of short beacons reduces the overall network airtime consumption, by reducing probe traffic. Additionally, the one or more network flow conditions include information for identifying the network flows and related applications including at least one or more of a number of connected clients in the network cell, a number of application flows in the network cell, and modulation and coding scheme (MCS) rates. In some examples, the prediction module 205 stores the network conditions 201 in the storage system 320 for further use by the prediction module.

At block 404, the prediction module 205 predicts, using a supervised learning structure or method such as a layered neural network and from the one or more network transmission conditions, an airtime effect 206a of SBA on the network cell. For example, as described above, the traffic performance prediction module 205a predicts and learns an impact on overall probe traffic from the client devices in the network cell and airtime consumption of the various transmissions (e.g., the short beacons, probe signals, target beacons etc.) during SBA and/or when short beacons are suppressed. In some examples, the traffic performance prediction module 205a uses machine learning, such as a multilayered neural network to optimize the airtime utilization of the network cell. For example, the traffic performance prediction module 205a predicts whether suppressing or enabling short beacons will reduce the airtime consumed by probing/scanning clients (based on an OCE to non-OCE ratio), while accounting for the airtime consumed by the short-beacons themselves. For example, the SBA engine 250 determines that short beacon transmission will reduce the overall probe traffic and airtime consumption for the network cell 102a when based on OCE to non-OCE ratio (e.g., 3-1 as discussed above) for the network cell 102a and the number of probing clients (e.g., the client devices 101d, 101c in the cell edge 106a).

In some examples, the probing traffic from the client devices 101c and 101d are not standardized, such that each device is configured to send probe signals and respond to short beacons in different manners (such as different transmission frequencies). Thus in some examples, the traffic performance prediction module 205a factors the client device properties/behaviors, including those learned during the SBA engine processes, when determining the predicted impact on overall probe traffic and airtime consumption. Further examples of airtime effect determination are discussed in relation to FIG. 5.

At block 406, the prediction module 205 predicts, using a supervised learning technique such as a layered neural network and from one or more network flow conditions, one or more application effects 206b of SBA on the network cell. For example, the application performance prediction module 205b, evaluates the impact of the change on delay-sensitive applications/network flows in response to SBA. In some examples, the application performance prediction module 205b integrates the predicted airtime effect 206a, determined by the traffic performance prediction module 205a, into the one or more application effects. In some examples, these applications and network flows are detected by the AP controller 110 and the typical behavior of the various applications is known and/or learned by the application performance prediction module 205b. For example, network flow for an application executing on the client devices may transmit RTP packets at predictable intervals (e.g. 20 ms) in the network flows used by the applications. When the interval between two real time protocol (RTP) packets exceeds a learnable threshold (e.g. 30 ms), the client drops the next packet in a queue of the network flow in order to maintain a near-real time timestamped flow. The application performance prediction module 205b thus determines/learns the expected results of the various identified application/network flows when short transmission beacons are activated. Further examples of airtime effect determination are discussed in relation to FIG. 6.

At block 408, the decision module 210 determines, from the airtime effects 206a and the one or more application effects 206b, a SBA decision 211 for the network cell. For example, the decision module 210 weighs the airtime effects of activating short beacon transmission against the effects to one or more applications and related network flows. In some examples, the decision module 210 determines that short beacons should be transmitted according to a default interval (e.g., 20 ms). In some examples, the decision module 210 determines either that the airtime effects 206a and/or the one or more application effects 206b would suffer from SBA and thus suppresses the transmission of short beacons. Further examples of SBA decision determinations are discussed in relation to FIG. 7.

At block 408, the system module 311 implements the SBA decision 211 for the network cell. For example, the SBA decision 211 instructs the system module to initiate and transmit short beacons according to the SBA interval. In another example, the SBA decision 211 instructs the system module to cease and/or suppress short beacon transmission. In some examples, the implemented SBA decision is used to provide additional network conditions, such as additional network conditions 201 for further feedback/learning for the prediction module 205 as well as other parameters 202 used for feedback/learning at the decision module 210.

In some examples, the SBA decision is reevaluated at configurable intervals and/or each time the cell conditions change beyond a threshold (e.g., a number of clients, client signal, channel utilization, etc.). In some examples, the thresholds are manually configured or dynamically learned through supervised learning. For example, the prediction for the a short beacon quantity is valid with a good success probability over a range of conditions, as soon as the degradation of the conditions cause the probability to drop, then the SBA decision is reevaluated.

Figure 5:
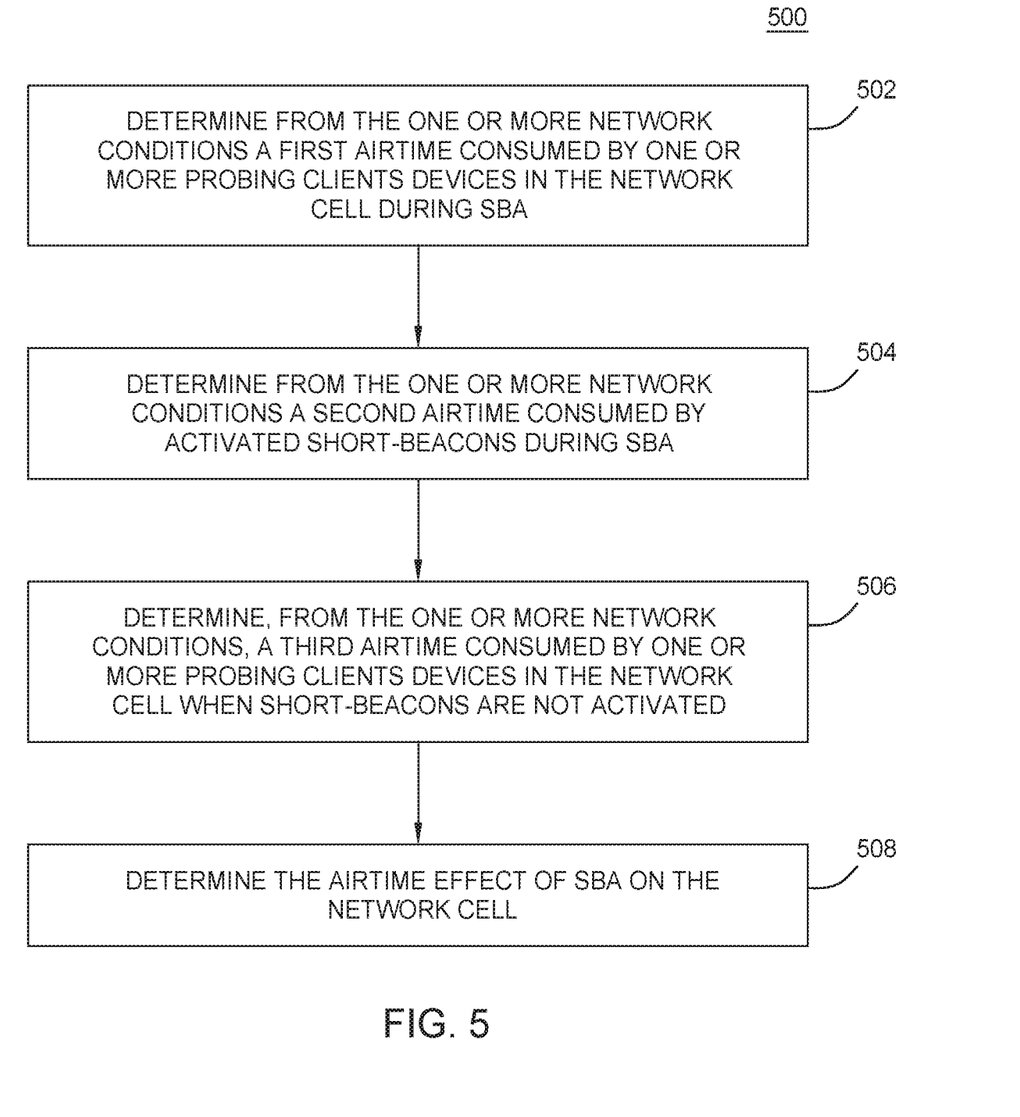
FIG. 5 is a flow chart outlining general operations for determining airtime effects of SBA on a network cell, according to embodiments described herein.

FIG. 5 is a flow chart outlining general operations for determining airtime effects of SBA on a network cell, according to embodiments described herein. Method 500 begins at block 502, where the prediction module 205, determines from the one or more network conditions a first airtime consumed by one or more probing client devices in the network cell during SBA. For example, the traffic performance prediction module 205a determines the airtime consumed by the scanning/probing clients (e.g., client devices 101a, 101d, and 101c) in the network cell 102a. At block 504, the prediction module 205 determines from the one or more network conditions a second airtime consumed by activated short-beacons during SBA. At block 506, the prediction module 205 determines from the one or more network conditions, a third airtime consumed by one or more probing client devices in the network cell when short-beacons are not activated.

At block 508, the decision module 210 determines, using a supervised learning technique, the airtime effect of SBA on the network cell. In some examples, if the amount of airtime consumed by the probing client devices without short beacon transmission is greater than the airtime that is consumed by short beacons, the short beacons should be activated. In another example, if the amount of airtime consumed by the probing clients is equal to or less than the airtime consumed by the probing clients, short beacons may or may not be beneficial as determined in conjunction with other factors described herein. Additionally, the traffic performance prediction module 205a functions as a multilayer/layered neural network which provides for the prediction module 205 to learn which set/types of clients and other network traffic conditions are optimized during SBA and which network conditions lend them to short beacon suppression.

Figure 6:
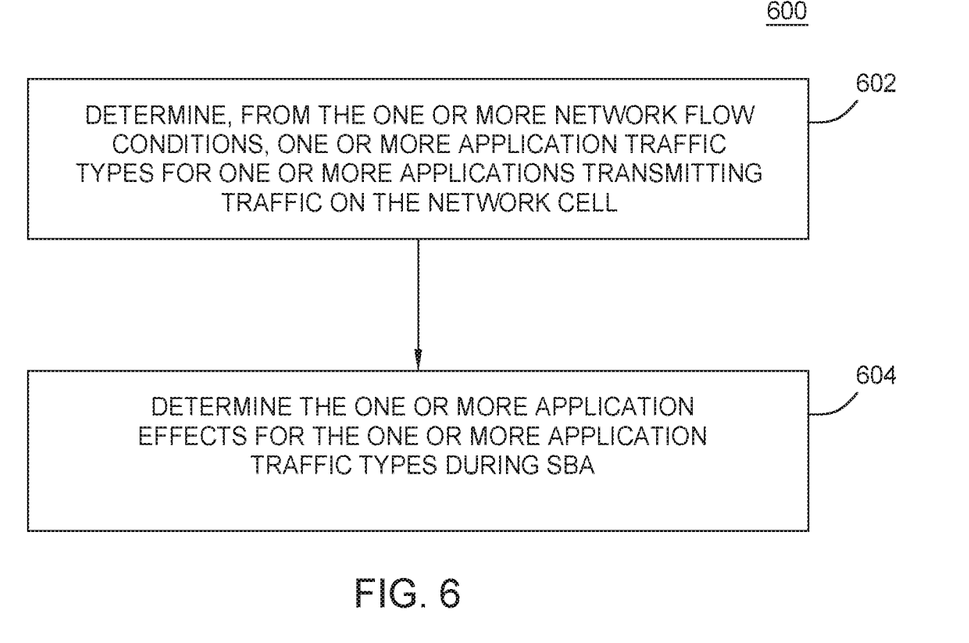
FIG. 6 is a flow chart outlining general operations for determining one or more application effects of SBA on the network cell, according to embodiments described herein.

FIG. 6 is a flow chart outlining general operations for determining one or more application effects of SBA on the network cell, according to embodiments described herein. As described above, in order to prevent applications dropping packets in network flows or other undesired behavior at the client devices, the application performance prediction module 205b records the presence of the one or more network flows and uses the network flow conditions (e.g., a number of clients in the network cell, number of flows, modulation and coding scheme (MCS) rates, etc.) in its determination. Method 600 begins at block 602, where the prediction module 205 determines, from the one or more network flow conditions, one or more application traffic types for one or more applications transmitting traffic on the network cell.

At block 604, the prediction module 205 determines, using the supervised learning technique, the one or more application effects for the one or more application traffic types during SBA. For example, the application performance prediction module 205b determines a first real time protocol (RTP) packet transmission; and a change in the RTP packet transmission during SBA. This can also be calculated as a mean (and sigma) interval between network flows (e.g., RTP flows). The application performance prediction module 205b then predicts the effect of SBA on the interval. In some examples, short beacon transmission reduces the overall consumed airtime in the network cell, but also results in an increase in the RTP packet interval, with a detrimental effect on RTP user experience at the client device.

Figure 7:
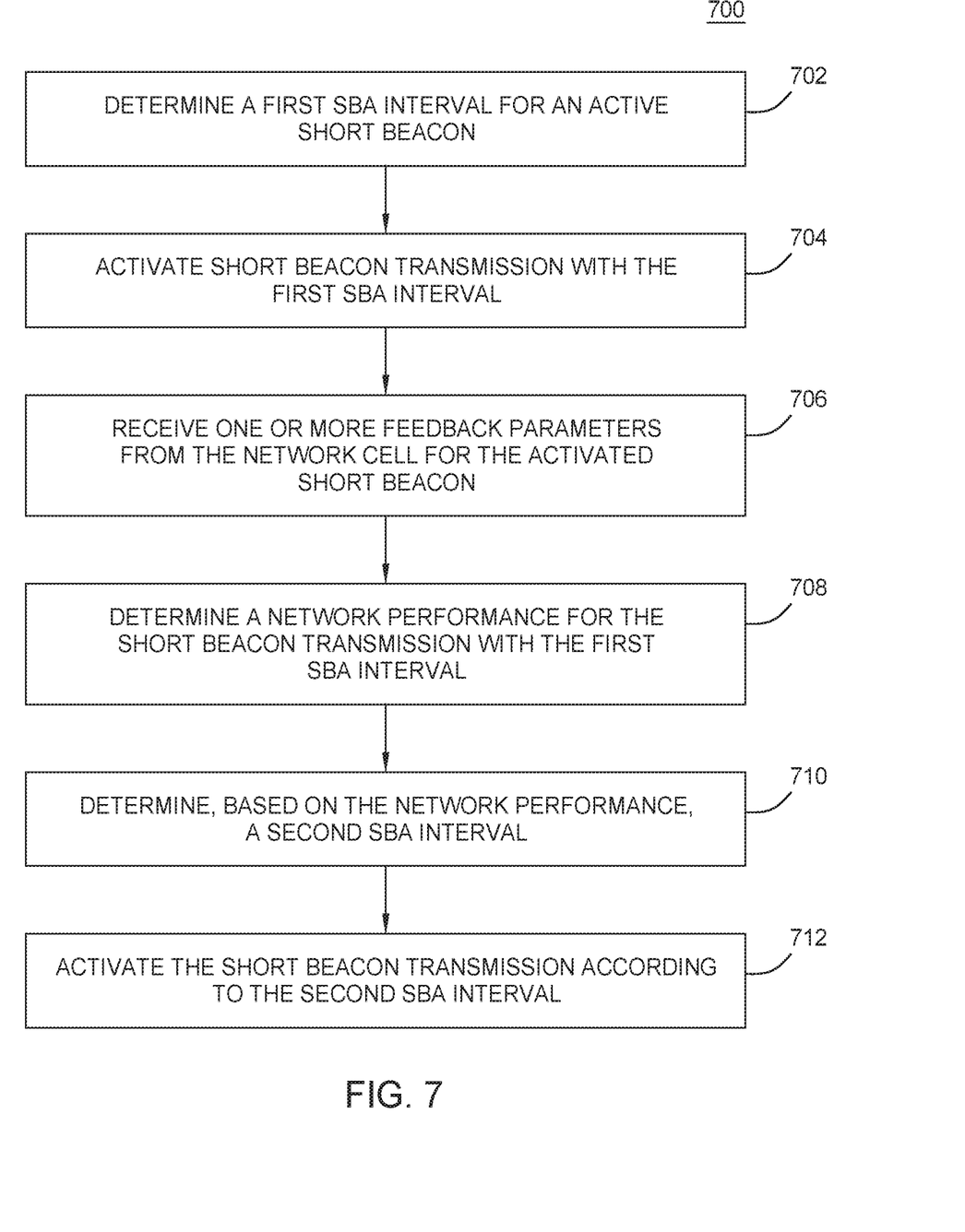
FIG. 7 is a flow chart outlining general operations for determining a SBA decision for the network cell, according to embodiments described herein.

FIG. 7 is a flow chart outlining general operations for determining a SBA decision for the network cell, according to embodiments described herein. Method 700 begins at block 702 where the decision module 210 determines a first SBA interval for an active short beacon. For example, the decision module may use a default interval value for SBA transmission (e.g., 20 ms) as the SBA interval. In another example, the decision module 210 may utilize a learned interval based on previous SBA periods.

At block 704, the decision module 210 activates short beacon transmission with the first SBA interval. In some examples, the decision module activates short beacon transmission by providing the SBA decision with the first SBA interval to the system module 311 for implementation. At block 706, the decision module 210, receives one or more feedback parameters from the network cell for the activated short beacon transmission. For example, the decision module 210 receives the other parameters 202.

At block 708, the decision module 210 determines a network performance for the short beacon transmission with the first SBA interval. For example, using the other/feedback parameters 202, the decision module 210 determines how the network cell 102a has actually reacted to the SBA. The determined network performance can also be used by the prediction module 205 to further train the layered neural network/supervised learning technique.

At block 710, the decision module 210 determines, based on the network performance, a second SBA interval. For example, the decision module 210 uses the trained neural network in order to determine if transmitting short beacons at a different interval improves/optimizes the network performance of the network cell, such as reducing wasted airtime without impacting network flows. At block 712, the system module activates the short beacon transmission using the second SBA interval in order to provide the optimized network performance.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for short beacon activation (SBA) at an access point (AP) in a network cell comprising:
   receiving one or more network conditions for the network cell comprising one or more network transmission conditions and one or more network flow conditions;
   predicting, using a supervised learning technique and from the one or more network transmission conditions, an airtime effect of SBA on the network cell based on airtime consumption of SBA and non-SBA transmissions in the network;
   predicting, using a supervised learning technique and from one or more network flow conditions, one or more application effects of SBA on the network cell; and
   determining, from the airtime effects and the one or more application effects, a SBA decision for the network cell; and
   implementing the SBA decision for the network cell where the AP activates or suppresses short beacon transmission according to the SBA decision.

2. The method of claim 1, wherein predicting the airtime effects comprises:
   determining from the one or more network conditions a first airtime consumed by one or more probing clients devices in the network cell during SBA;
   determining from the one or more network conditions a second airtime consumed by activated short-beacons during SBA;
   determining, from the one or more network conditions, a third airtime consumed by one or more probing clients devices in the network cell when short-beacons are not activated; and
   determining, using the supervised learning technique, the airtime effect of SBA on the network cell.

3. The method of claim 2, wherein the one or more network transmission conditions comprises at least one or more of:
   an AP deployment density in the network cell;
   a position of a connected device in the network cell;
   a number of APs visible to the connected device;
   a ratio of clients supporting short beacons connected to the network cell to clients not supporting short beacons;
   a measure of current probe traffic statistics; and
   a current state of short-beacon transmissions in the network cell.

4. The method of claim 2, wherein predicting the one or more application effects of SBA on the network cell comprises:
   determining, from the one or more network flow conditions, one or more application traffic types for one or more applications transmitting traffic on the network cell; and
   determining, using the supervised learning technique, the one or more application effects for the one or more application traffic types during SBA.

5. The method of claim 4, wherein the one or more network flow conditions comprises at least one or more of:
   a number of connected clients in the network cell;
   a number of application flows in the network cell; and
   modulation and coding scheme (MCS) rates; and
   wherein the one or more application effects comprises one or more of:
   a first real time protocol (RTP) packet transmission; and
   a change in the RTP packet transmission during SBA.

6. The method of claim 4, wherein determining the SBA decision for the network cell for the network cell comprises:
  determining a first SBA interval for an active short beacon transmission;
  activating short beacon transmission with the first SBA interval; and
  receiving one or more feedback parameters from the network cell for the activated short beacon transmission.

7. The method of claim 6, further comprising:
  determining a network performance for the short beacon transmission with the first SBA interval;
  determining, based on the network performance, a second SBA interval; and
  wherein implementing the SBA decision for the network cell comprises:
    activating the short beacon transmission according to the second SBA interval.

8. A system for short beacon activation (SBA) at an access point (AP) in a network cell, comprising:
  a processor; and
  a memory comprising instructions which, when executed on the processor, performs an operation, the operation comprising:
    receiving one or more network conditions for the network cell comprising one or more network transmission conditions and one or more network flow conditions;
    predicting, using a supervised learning technique and from the one or more network transmission conditions, an airtime effect of SBA on the network cell based on airtime consumption of SBA and non-SBA transmissions in the network;
    predicting, using a supervised learning technique and from one or more network flow conditions, one or more application effects of SBA on the network cell; and
    determining, from the airtime effects and the one or more application effects, a SBA decision for the network cell; and
    implementing the SBA decision for the network cell where the AP activates or suppresses short beacon transmission according to the SBA decision.

9. The system of claim 8, wherein predicting the airtime effects comprises:
  determining from the one or more network conditions a first airtime consumed by one or more probing clients devices in the network cell during SBA;
  determining from the one or more network conditions a second airtime consumed by activated short-beacons during SBA;
  determining, from the one or more network conditions, a third airtime consumed by one or more probing clients devices in the network cell when short-beacons are not activated; and
  determining, using the supervised learning technique, the airtime effect of SBA on the network cell.

10. The system of claim 9, wherein the one or more network transmission conditions comprises at least one or more of:
  an AP deployment density in the network cell;
  a position of a connected device in the network cell;
  a number of APs visible to the connected device;
  a ratio of clients supporting short beacons connected to the network cell to clients not supporting short beacons;
  a measure of current probe traffic statistics; and
  a current state of short-beacon transmissions in the network cell.

11. The system of claim 9, wherein predicting the one or more application effects of SBA on the network cell comprises:
  determining, from the one or more network flow conditions, one or more application traffic types for one or more applications transmitting traffic on the network cell; and
  determining, using the supervised learning technique, the one or more application effects for the one or more application traffic types during SBA.

12. The system of claim 11, wherein the one or more network flow conditions comprises at least one or more of:
  a number of connected clients in the network cell;
  a number of application flows in the network cell; and
  modulation and coding scheme (MCS) rates; and
  wherein the one or more application effects comprises one or more of:
    a first real time protocol (RTP) packet transmission; and
    a change in the RTP packet transmission during SBA.

13. The system of claim 11, wherein determining the SBA decision for the network cell for the network cell comprises:
  determining a first SBA interval for an active short beacon transmission;
  activating short beacon transmission with the first SBA interval; and
  receiving one or more feedback parameters from the network cell for the activated short beacon transmission.

14. The system of claim 13, further comprising:
  determining a network performance for the short beacon transmission with the first SBA interval;
  determining, based on the network performance, a second SBA interval; and
  wherein implementing the SBA decision for the network cell comprises:
    activating the short beacon transmission according to the second SBA interval.

15. A computer program product for short beacon activation (SBA) at an access point (AP) in a network cell, the computer program product comprising a non-transitory computer-readable medium program having program instructions embodied therewith, the program instructions executable by a processor to perform an operation comprising:
  receiving one or more network conditions for the network cell comprising one or more network transmission conditions and one or more network flow conditions;
  predicting, using a supervised learning technique and from the one or more network transmission conditions, an airtime effect of SBA on the network cell based on airtime consumption of SBA and non-SBA transmissions in the network;
  predicting, using a supervised learning technique and from one or more network flow conditions, one or more application effects of SBA on the network cell; and
  implementing the SBA decision for the network cell where the AP activates or suppresses short beacon transmission according to the SBA decision.

16. The computer program product of claim 15, wherein predicting the airtime effects comprises:
  determining from the one or more network conditions a first airtime consumed by one or more probing clients devices in the network cell during SBA;

determining from the one or more network conditions a second airtime consumed by activated short-beacons during SBA;

determining, from the one or more network conditions, a third airtime consumed by one or more probing clients devices in the network cell when short-beacons are not activated; and determining, using the supervised learning technique, the airtime effect of SBA on the network cell.

17. The computer program product of claim 16, wherein the one or more network transmission conditions comprises at least one or more of:

an AP deployment density in the network cell;

a position of a connected device in the network cell;

a number of APs visible to the connected device;

a ratio of clients supporting short beacons connected to the network cell to clients not supporting short beacons;

a measure of current probe traffic statistics; and a current state of short-beacon transmissions in the network cell.

18. The computer program product of claim 16, wherein predicting the one or more application effects of SBA on the network cell comprises:

determining, from the one or more network flow conditions, one or more application traffic types for one or more applications transmitting traffic on the network cell; and determining, using the supervised learning technique, the one or more application effects for the one or more application traffic types during SBA.

19. The computer program product of claim 18, wherein the one or more network flow conditions comprises at least one or more of:

a number of connected clients in the network cell;

a number of application flows in the network cell; and modulation and coding scheme (MCS) rates; and wherein the one or more application effects comprises one or more of:

a first real time protocol (RTP) packet transmission; and a change in the RTP packet transmission during SBA.

20. The computer program product of claim 18, wherein determining the SBA decision for the network cell for the network cell comprises:

determining a first SBA interval for an active short beacon transmission;

activating short beacon transmission with the first SBA interval;

receiving one or more feedback parameters from the network cell for the activated short beacon transmission;

determining a network performance for the short beacon transmission with the first SBA interval;

determining, based on the network performance, a second SBA interval; and wherein implementing the SBA decision for the network cell comprises:

activating the short beacon transmission according to the second SBA interval.

\* \* \* \* \*